(12) United States Patent
Frink et al.

(10) Patent No.: US 6,678,002 B2
(45) Date of Patent: Jan. 13, 2004

(54) HDTV EDITING AND EFFECTS PREVISUALIZATION USING SDTV DEVICES

(75) Inventors: Craig R. Frink, Chelmsford, MA (US); Raymond Cacciatoro, Westford, MA (US)

(73) Assignee: Avid Technology, Inc., Tewksbury, MA (US)

(*) Notice: Subject to any disclaimer, the term of this patent is extended or adjusted under 35 U.S.C. 154(b) by 18 days.

(21) Appl. No.: 09/800,883

(22) Filed: Mar. 7, 2001

(65) Prior Publication Data

US 2001/0017667 A1 Aug. 30, 2001

Related U.S. Application Data

(63) Continuation of application No. 09/054,867, filed on Apr. 3, 1998, now Pat. No. 6,226,038.

(51) Int. Cl.[7] .......................... H04N 7/01; H04N 11/20
(52) U.S. Cl. ......................... 348/445; 348/722; 386/52
(58) Field of Search ............................ 348/458, 459, 348/446, 445, 447, 448, 441, 443, 720, 578, 722, 555, 556; 386/123, 52, 55; H04N 7/01, 11/20, 5/46

(56) References Cited

U.S. PATENT DOCUMENTS

| 5,606,652 A | | 2/1997 | Silverbrook |
| 5,999,220 A | * | 12/1999 | Washino ..................... 348/441 |
| 6,226,038 B1 | * | 5/2001 | Frink et al. ................. 348/443 |

* cited by examiner

Primary Examiner—Michael H. Lee
(74) Attorney, Agent, or Firm—Peter J. Gordon

(57) ABSTRACT

A system provides real-time previsualization of effects to be added to high definition (HD) video data and real-time rendering of the HD video data including the added effects. The computer based system for editing high definition television (HDTV) resolution video includes a high definition video system connected to a standard definition video system and a high definition storage system. A resizer reformats the high definition video data to standard definition resolution for real-time processing and previsualization.

2 Claims, 14 Drawing Sheets

US 6,678,002 B2

HDTV EDITING AND EFFECTS PREVISUALIZATION USING SDTV DEVICES

This is a continuation of Ser. No. 09/054,867, filed Apr. 3, 1998, now U.S. Pat. No. 6,226,038.

FIELD OF THE INVENTION

The present invention is related to editing high definition video data.

BACKGROUND OF THE INVENTION

Currently, standard definition television (SDTV) resolution editors exist which are used for editing video data. It is possible to create a composition and view the editing effect in real time. However, for editing high definition television (HDTV) resolution video data, high definition (HD) editing equipment may be cost prohibitive and HD video data that is edited is often stored back to a storage system each time an edit is made and the edited version of the HD video data is viewed only after the effects are made. When more edits are needed, the HD video data is sent to an editor, edited and saved again to the storage system. The edited version is then available to be viewed. This process is expensive and time consuming.

With the advances in high definition television (HDTV) resolution systems and the uncertainties in future standards, a need exists for editing HDTV video data cost effectively. Current SDTV systems do not allow editing or digital video manipulation of original HDTV compressed video data and the ability to display the edited HDTV video data in full resolution.

SUMMARY OF THE INVENTION

The present invention provides a system for real-time previsualization of effects to be added to high definition (HD) video data and real-time rendering of the HD video data including the added effects. The system includes a resizer for reformatting the HD video data to fit within the bandwidth limits of standard definition (SD) equipment.

Accordingly, one aspect is a system for editing high definition video data. A random-access, computer-readable and re-writeable storage system stores high definition video data in data files. A high definition video system includes a high definition video data router for receiving high definition video data from the storage system and directing the high definition video data to a first and a second output. A resizer is connected to the first output of the router and has an output providing standard definition resolution video data based on the high definition video data. A high definition output module is connected to the second output of the router. A standard definition video editing system includes a standard definition digital video effects module having an input for receiving the output of the resizer and a display, such as a standard definition monitor or computer monitor for previsualizing video data with the added effects which is output from the standard definition digital video effects module at an high definition frame rate.

Another aspect is a method for editing high definition video data using standard definition video equipment. High definition video data is received and resized to fit the bandwidth of the standard definition video equipment. Effects are added to the resized high definition video data in real-time using the standard definition video equipment and the resized high definition video data including the added effects is previsualized on standard definition video equipment. Full resolution high definition video data with the added effects is rendered.

Another aspect is using a high definition television resolution monitor for full resolution viewing of the edited data at high definition frame rates.

Another aspect is using a multiformat router as the high definition video data router.

Another aspect is saving an original copy of high definition video data in a data file and resizing the high definition video data while retaining the original high definition video data unchanged in memory.

Another aspect is storing the result of rendering full resolution high definition video data with added effects in a data file.

BRIEF DESCRIPTION OF THE DRAWING

In the drawing,

FIGS. 1c–1f show modifications to the editing system of FIG. 1a;

DETAILED DESCRIPTION

Figure 1A:
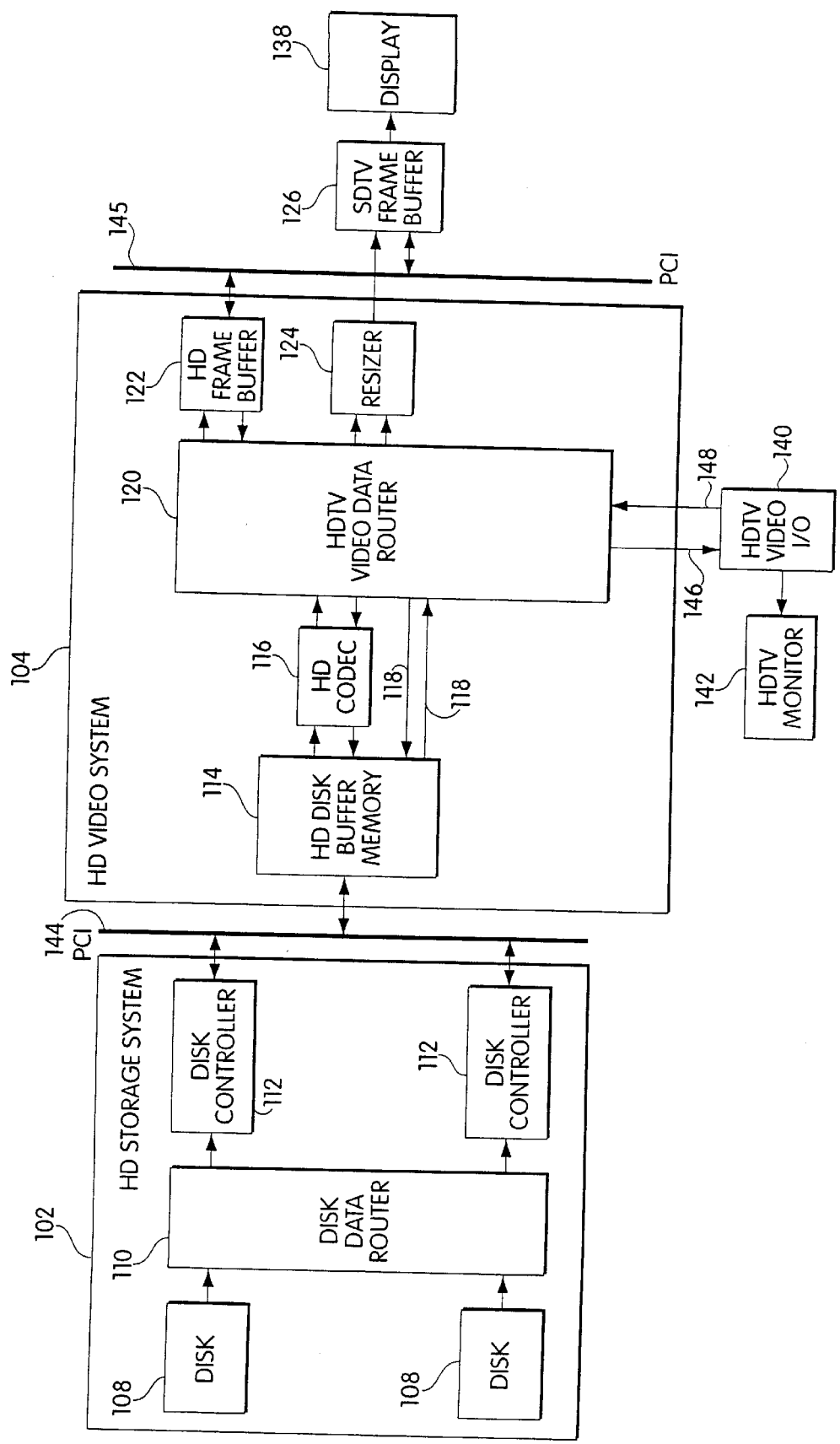
FIG. 1a is a block diagram of a high definition television (HDTV) resolution editing system.

FIG. 1a is a block diagram of one embodiment of a system for editing high definition television (HDTV) resolution video data with a single stream of video data to be edited. FIG. 1a includes a high definition (HD) video system 104 connected by bus 144 to an HD storage system 102. HD video system 104 is also connected by bus 145 to a standard definition television (SDTV) resolution frame buffer 126, which in turn is connected to a display 138, which may be progressive or interlaced format, such as a computer display or an standard definition (SD) monitor. The data displayed is related to the format of the HD video data (e.g., if the HD data is in progressive format, then the SD display is a progressive format display). HDTV video input/output module 140 is connected to an output of router 120 and provides an output to HDTV monitor 142. Another editing system may be found in U.S. patent application entitled "EDITING SYSTEM WITH ROUTER FOR CONNECTION TO HDTV CIRCUITRY" by Morton Tarr et al. filed Apr. 3, 1998.

In order for a digital HDTV video signal to fit in the transmission bandwidth of standard systems (e.g., systems conforming to National Television Systems Committee (NTSC) or Sequential Color and Memory (SECAM) standards), the HDTV video signal may typically be compressed using a ratio of about 5:1. For example, the NTSC standard requires an aspect ratio (ratio of width to height) of 4:3 with 525 scanning lines per picture and a television signal bandwidth of 6 MHz. The SECAM standard specifies 625 scanning lines per picture and a television signal bandwidth of 8 MHz. SDTV resolution video formats are typically 704-pixel-by-480-line or 640-pixel-by-480-line. In contrast, HDTV-resolution video data typically requires 30 MHz of bandwidth, doubles the number of scan lines in a frame and changes the aspect ratio to 16:9. HDTV-resolution video is typically 1920-pixel-by-1080-line, although it may be in other formats, such as 1280-pixel-by-720-line in progressive or interlaced formats. HD video data may include any data at a resolution higher than SD video data, such as, for example, data with a resolution greater than 525 scan lines having a component rate of more than 30 frames/second, with 8 or 10-bit precision. HD data may be interlaced or progressively scanned and the present invention is not limited to either format.

In an embodiment of the present invention, the single stream editing system of FIG. 1a can operate in real-time to perform cut edits by randomly sequencing a non-linear, high definition storage system 102 to output data in an order indicated by a desired video sequence. The storage system 102 may be, for example, a randomly accessible disk array.

The HD video system 104 of FIG. 1a includes an HD video data router 120 for receiving video data and directing video data to HID video input/output module 140, to frame buffer 122 or to resizer 124. Resizer 124 adjusts the higher resolution data to a lower resolution format. For example, resizer 124 reformats HD video data to provide an output which fits the bandwidth of SDTV equipment which can typically process data with a resolution less than 525 scan lines having a component rate of less than 30 frames/second. The output of resizer 124 is sent to SDTV frame buffer 126. Resizer 124 reformats the HDTV-video data to allow an SDTV representation to be displayed on SDTV equipment such as an NTSC monitor or RGB computer monitor 138. Before resizer 124 reformats the data, the data is low-pass filtered to avoid aliasing the data. Resizer 124 then generates only desired output data.

Figure 1B:
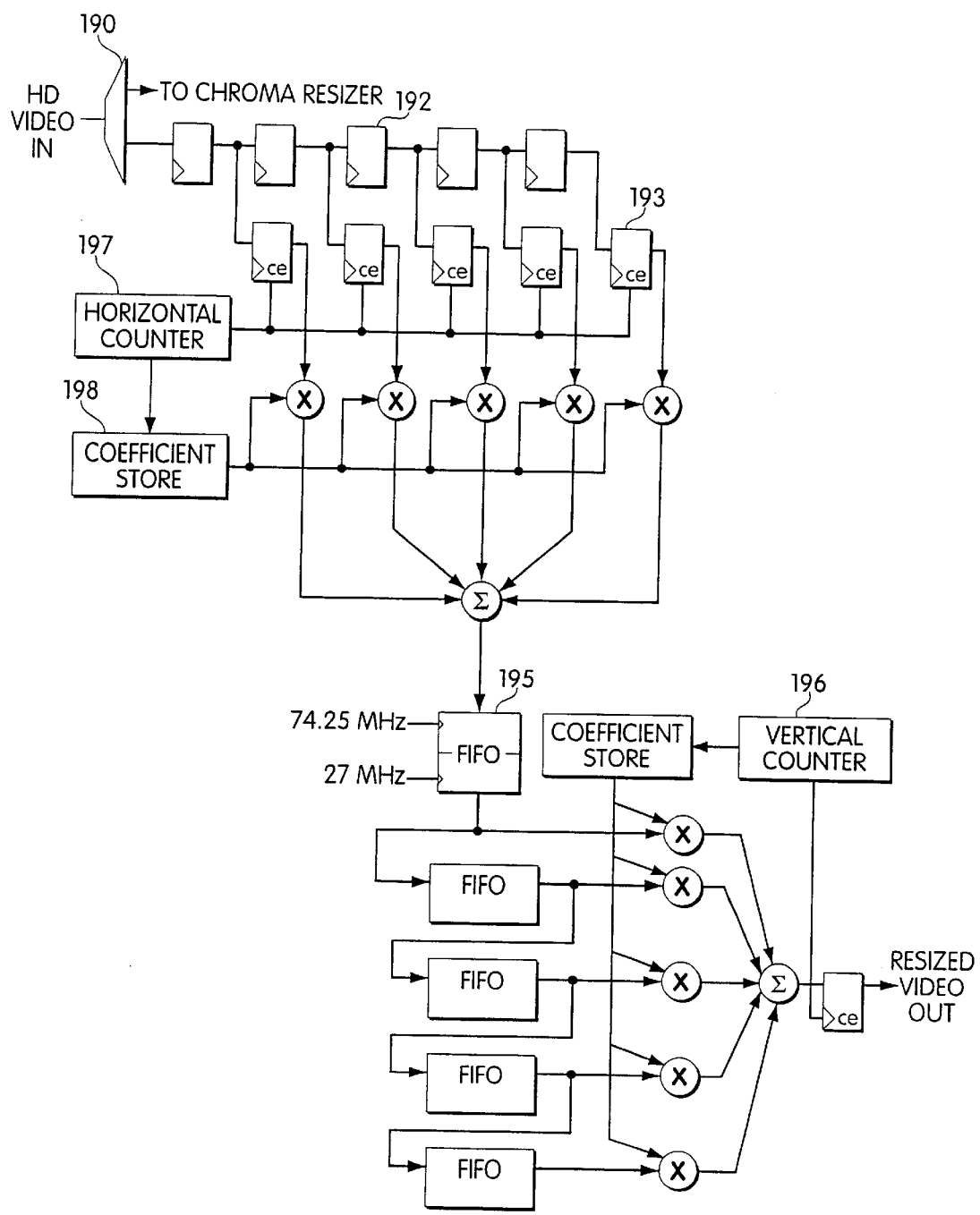
FIG. 1b is a resizer according to an embodiment.

FIG. 1b illustrates an example resizer. The resizer shown in FIG. 1b operates on the luma component of the HD video data. A similar resizer circuit may be used to resize the chroma component of the HD video data. The demultiplexer 190 receives HD video data as an input. Demultiplexer 190 separates a 148.5 MHz HD video stream into two 74.25 MHz streams, one of which contains the luma components and the other of which contains the chroma components. Field Programmable Gate Arrays (FPGA) may be used in the resizer when the data rate is 74.25 MHz, which is within the range of FPGA devices. In an alternate embodiment, an Application Specific Integrated Circuit (ASIC) may be used.

The embodiment shown in FIG. 1b uses 5-tap filters to perform a 5:1 resize operation. However, the number of filters taps can be changed to perform other resize operations. The resizer changes the data rate by a ratio of 1920/720 to produce SDTV-compliant video. By changing the values stored in the vertical counter 196, horizontal counter 197, and the coefficient stores 198, the resizer may scale the video to any arbitrary size.

The luma component of the video is clocked into a first set of registers 192 at the HD video rate, and then clocked into a second set of registers 193 at a rate determined by the horizontal resize factor. The desired horizontal pixel value is calculated by multiplying the five current coefficients by their respective input pixels, and summing the results. The coefficients represent functions which determine the weighting given to each input pixel. After each new output pixel is calculated, the input data is advanced by a value determined by the horizontal counter, thereby presenting the appropriate data to calculate the next pixel. For an operation which reduces an input image by a ratio N:1, the horizontal resize circuit may, on average, produce a new pixel every N 74.25 MHz clock cycles.

The output of the horizontal resizer may be written to a FIFO 195 on selected clock cycles at the HD component clock rate of 74.25 MHz. The data is read from the FIFO 195 at the SD rate of 13.25 MHz and vertical resize operations are performed at the SD clock rate. The vertical resizer may operate similarly to the horizontal resizer, except that resized lines are stored, rather than pixels, prior to calculating the next output value.

Intermediate storage elements not shown in FIG. 1b may be used to facilitate operation at the required clock rate. The coefficients and counter values may be stored within the device, or they may be loaded by a host computer or other controlling device.

There are several kinds of systems (e.g., HD video system 104) that may be used to author, process and display multimedia data. These systems may be used to modify the data, define different combinations of data, create new data and display data to a user. A variety of techniques are known in the art for implementing these kinds of systems.

Multimedia authoring, processing and playback systems typically have a data structure which represents the multimedia composition. The data structure ultimately refers to clips of source material, such as digitized video or audio, using an identifier of the source material, such as a unique identifier or a file name, and possibly a temporal range within the source material defining the clip. The identifier may be of a type that may be used with a list of equivalent data files to identify a file name for the source material. An index may be used to translate the temporal range in the source into a range of bytes within a corresponding file. This range of bytes may be used with the segment table for the file to identify segments of data that are needed and the storage units from which the data is retrieved.

A list structure may be used to represent part of a multimedia composition. Clips may include a reference to a source identifier and a range within the list. Generally, there may be such a list for each track of media in a temporal composition. There are a variety of data structures which may be used to represent a composition. In addition to a list structure, a more complex structure is shown in PCT Published Application WO93/21636 published on Oct. 28, 1993. Other example representations of multimedia compositions include those defined by Open Media Framework Interchange Specification from Avid Technology, Inc., Advanced Authoring Format from the Multimedia Task Force, QuickTime from Apple Computer, DirectShow from Microsoft, and Bento also from Apple Computer, and as shown in PCT Publication WO96/26600.

The data structure described above and used to represent multimedia programs may use multiple types of data that are synchronized and displayed. The most common example is a television program or film production which includes motion video (often two or more streams or tracks) with associated audio (often four or more streams or tracks).

Because the video and audio data may be stored in different data files and may be combined arbitrarily, better performance may be obtained if requests for data for these different data files are managed efficiently. For example, an application may identify a stream for which data can be read, and then may determine an amount of data which should be read, if any. A process for performing this kind of management of read operations is shown in U.S. Pat. No. 5,045,940. In general, an application determines which stream has the least amount of data available for display. If there is a sufficient amount of memory for data to be played back for that stream to efficiently read an amount of data, then that data is read from the file. When it is determined that data for a stream should be requested, each segment of the data is requested from a storage unit selected from those on which the segment is stored. In order to identify which files to request from the storage unit, the editing system may convert a data structure representing a composition, into file names and ranges within those files.

In FIG. 1a, disk buffer memory 114 may be, for example, a circular buffer and it receives a sequence of digital still image. Each still image may represent a single frame, i.e., two fields, or a single field of motion video data from HD storage system 102 which is to be processed to render edited video data. Application software such as, for example, software used in the Media Composer editing system by Avid Technology, Inc., may play the sequence of digital still images to be manipulated into the buffer memory 114. Disk buffer memory 114 may hold multiple frames of video to be sent through one or more coder/decoder processors (codecs) 116 to router 120 to reduce overhead when linear devices are used with the non-linear access storage system 102.

Display 138, such as an SDTV monitor or computer display, is connected to SDTV frame buffer 126 and is used for previsualizing HDTV composites which have been processed to include user specified edits. HDTV monitor 142 receives an output from HDTV video I/O module 140 and is used for viewing full resolution rendered HDTV composites which include the edits previsualized on the SDTV equipment.

A hardware dataflow interface which enables asynchronous data processing elements to be interconnected using an interconnection protocol that controls the flow of data between processing elements may be used to control the flow of data between elements in FIGS. 1a, 1c–3 and 5–7. Such an interface is described in U.S. patent application Ser. No. 08/879,981 filed Jun. 20, 1997, U.S. Patent entitled "APPARATUS AND METHOD FOR CONTROLLING TRANSFER OF DATA BETWEEN AND PROCESSING OF DATA BY INTERCONNECTED DATA PROCESSING ELEMENTS" by Craig R. Frink filed Apr. 3, 1998, U.S. patent application entitled "A PACKET PROTOCOL FOR ENCODING AND DECODING VIDEO DATA AND DATAFLOW SIGNALS AND DEVICES FOR IMPLEMENTING THE PACKET PROTOCOL" by Craig R. Frink et al. filed Apr. 3, 1998, and U.S. patent application entitled "METHOD AND APPARATUS FOR CONTROLLING DATA FLOW BETWEEN DEVICES CONNECTED BY A MEMORY" by Craig R. Frink which are incorporated herein by reference. The flow control allows the processing elements to be media and format independent. The system is not limited to flow control and other interfaces and methods for synchronization may also be used. For example, in FIG. 1a, a dataflow interface may be used to control the flow of data between storage system 102 and HD video system 104 or data between HD video system 104 and SDTV frame buffer 126.

Figure 1C:
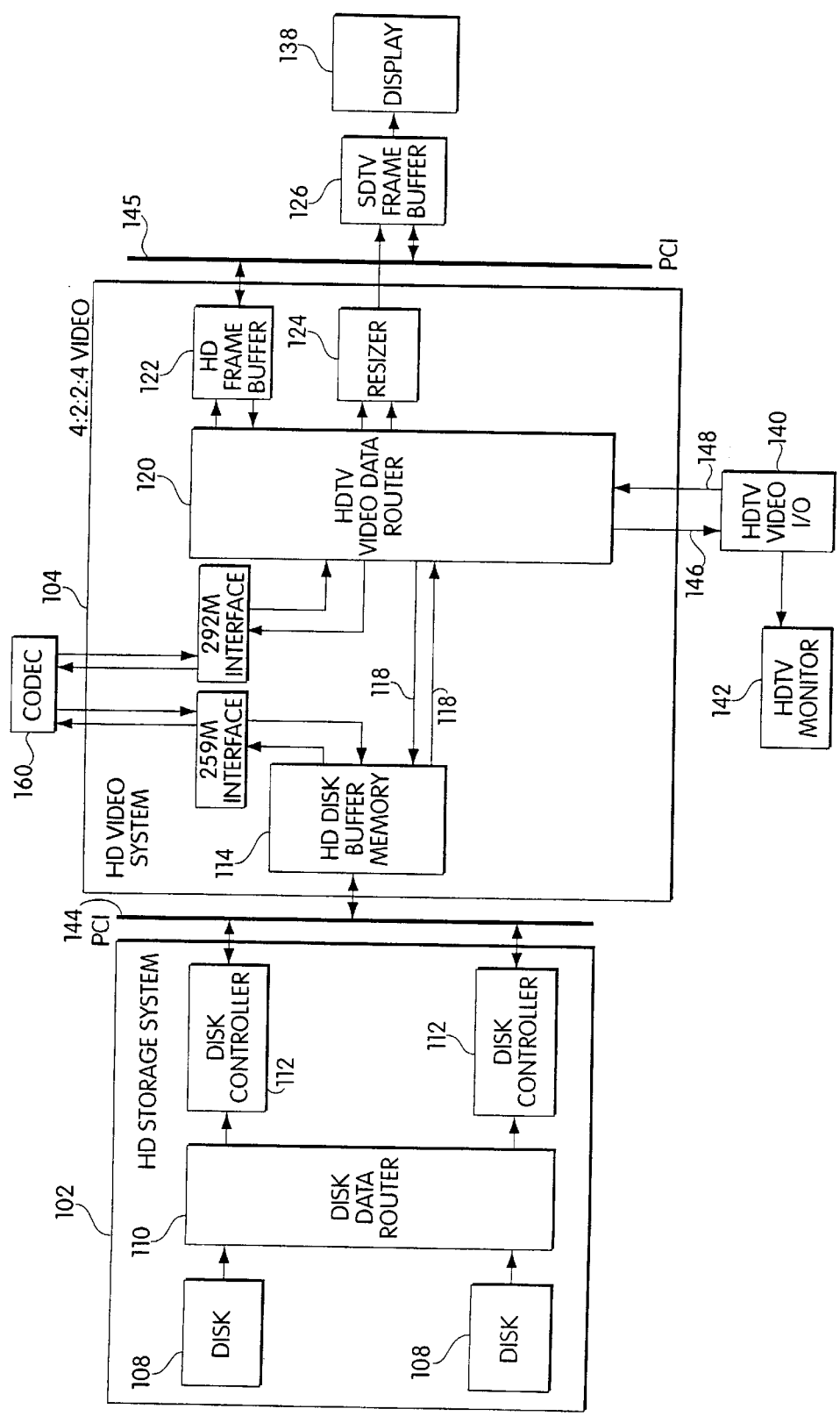

The system shown in FIG. 1a may be modified to include an external HDTV codec 160 as shown in FIG. 1c, with for example, Panasonic's HD-D5 codec for tape-based HDTV video storage. Using this codec in the non-linear editing (NLE) application shown in FIG. 1a allows format compatibility with Panasonic HDTV recording methods, and may be used to compress and decompress HDTV video that is too large to fit within the limits of an editing system. The Panasonic HDTV codec can replace HD codec 116 and is connected to the disk buffer memory 114 and HDTV router 120 using conventional methods (such as Society of Motion Picture and Television Engineers (SMPTE) standard interfaces 259M and 292M). This method of connectivity applies equally to other devices, including the video data router, video I/O, and other codec devices (Sony HDCam, MPEG2 HL @PP, etc.).

Figure 1D:
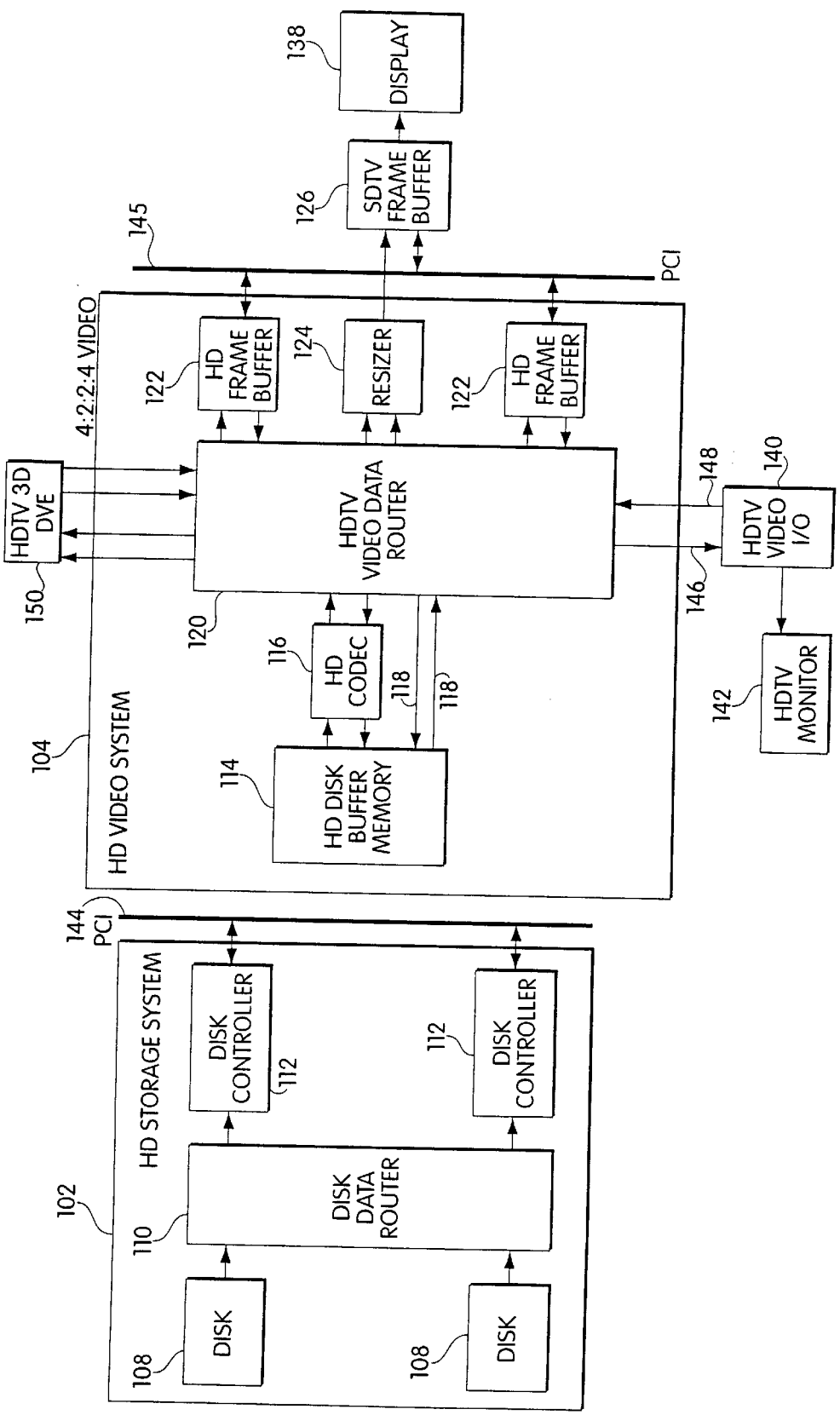
Figure 1E:
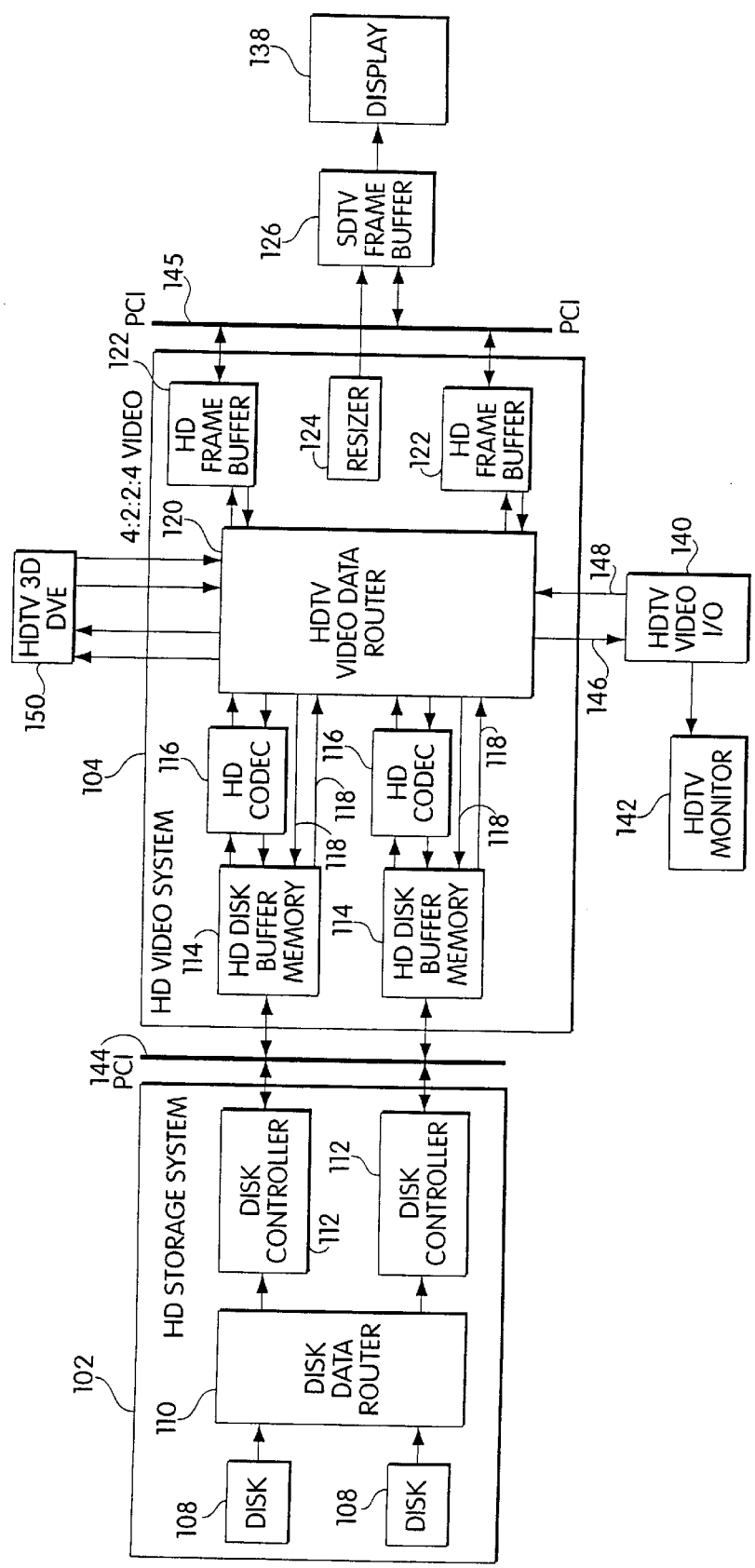
Figure 1F:
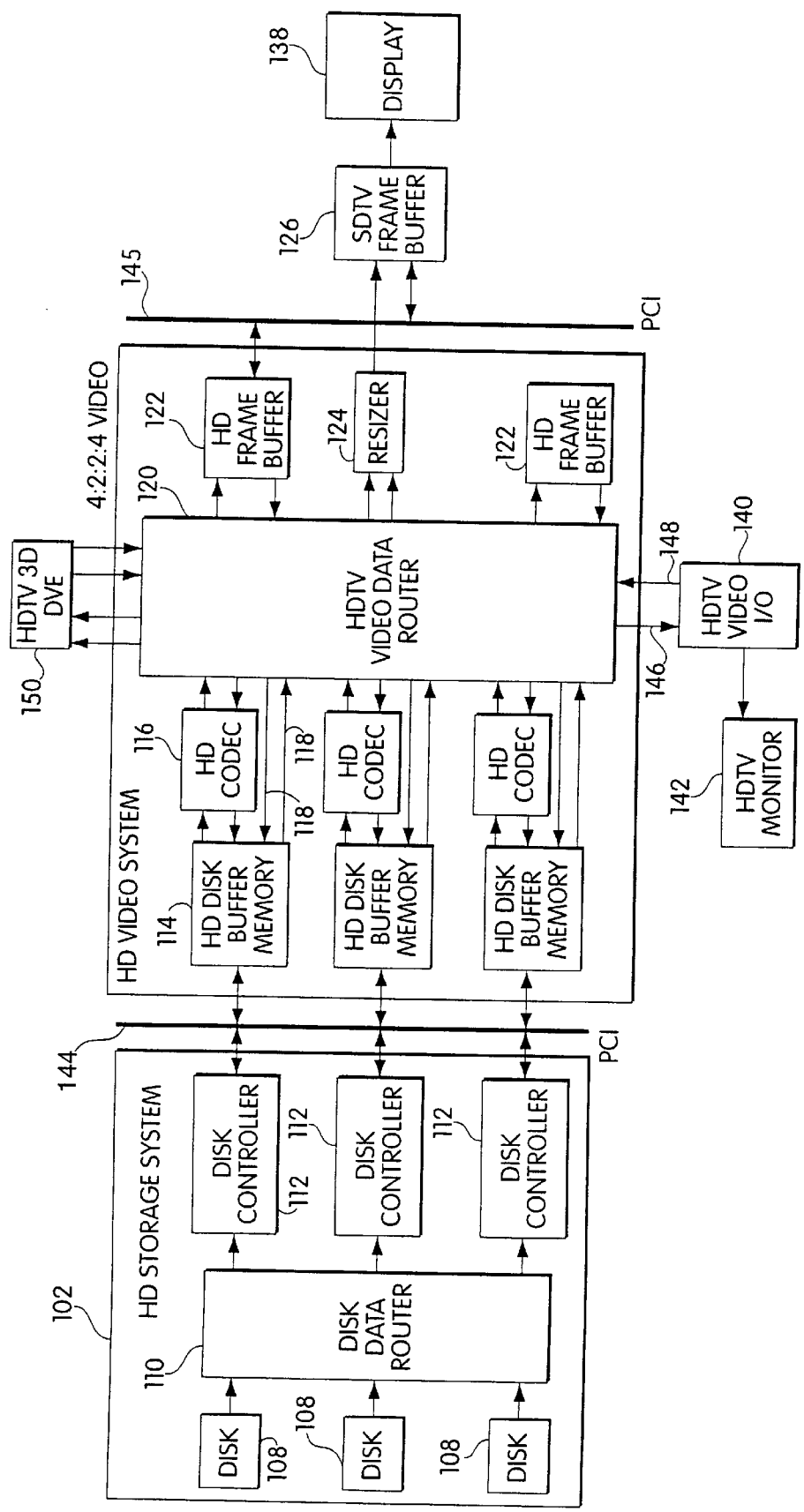

The real-time single stream HDTV editing system shown in FIG. 1e may use significant rendering time when using digital video effects (DVEs) that involve multiple streams (dissolve, super-imposition, positioning of a keyed image, etc.). The DVEs added using the HDTV editing system of FIG. 1c can be viewed once they are rendered but are not generally able to be viewed when being constructed.

In one embodiment, the rendering time can be reduced by modifying the system of FIG. 1a through the addition of a hardware DVE module 150, as shown in FIG. 1d. The hardware DVE module 150 which is connected to HDTV video data router 120 and is used to accelerate video manipulation operations, such as, for example, 3D DVEs or 2D resizing. In this embodiment, the editing system includes a hardware DVE module and second frame buffer, similar to frame buffer 122, for storing an alpha channel, in addition to the video, and to provide connectivity bandwidth for simultaneous access of two streams (i.e., one writing and one reading). This system operates similarly to the system of FIG. 1a, but instead of reading the frame buffer contents using software when rendering a DVE, the system plays one stream of video into one of the frame buffers (e.g., 122), and then plays a second stream directly to the DVE module 150. The video stored in the frame buffer (e.g., 122) is read in concert with the video playing from disk (e.g., 108), and both streams pass through the DVE module together. The resulting video is stored to the added second frame buffer and the resulting video may then become the source video for a subsequent DVE, or stored back to disk.

In another modification of FIG. 1a shown in FIG. 1e, the addition of a second video channel from the storage system 102 enables the playing of multiple video streams concurrently for real-time DVEs and allows the DVE operations to be visualized in real-time. This includes adding an additional disk buffer 114, an additional HD codec 116 and an additional HD-1080 frame buffer 122 to the system of FIG. 1a. The dual stream system uses dual HDTV data rate and resolution frame buffers to capture video and an alpha channel when rendering more than two streams of video (the ability to store the alpha channel in the rendered video allows foregrounds to be composited, rather than rendering backgrounds only). The frame buffers also provide a mechanism for frame delay compensation when switching elements in and out of the video pipeline which connects the video devices in the system.

The HDTV video devices shown in FIG. 1a may be separate components (such as when using a Panasonic HD-D5 codec), may be external to a computer (as is common when using conventional linear video equipment), or may be combined into a single design (as is common in most computer-based NLE equipment).

In one embodiment, the modified system of FIG. 1a just described, which includes a second video channel from storage system 102, may use non real-time hardware assisted rendering when the number of streams that are combined in a composition increases beyond the real-time capability of the system (two streams in the above system). For example, in the system shown in FIG. 1f, in a three layer composition (three concurrent video streams) the first two streams may be combined and the result stored in a frame buffer. Multiple frames in a sequence can be processed for efficiency. The third stream is added to the intermediate result stored in the HDTV frame buffer (e.g., 114) by using only one of the video stream channels from the storage system (e.g., 102). The resulting video from the final compositing step (combining the third stream with the result of the first two streams) can then be stored back to disk (e.g., 108) using the second video stream channel, or rendered again to a frame buffer (e.g., 114). The video (and alpha) channel may also be stored compressed or uncompressed to disk. The system is able to store video with its associated alpha channel, when one is generated, for combination with foreground streams. Backgrounds may also be stored to reduce the overhead of storing alpha streams to disk.

The modified system described above provides real-time performance and improves rendering time. However, non real-time rendering is often used since the number of codecs used in the system may limit real-time operation. The addition of a third video channel allows two streams of video to be played while one is recorded. Intermediate composites can be stored to disk in real-time for immediate application as more layers of video (equating to more streams) are combined. The video and associated alpha stream (compressed using run length encoding) may be stored together for simplicity, or may be stored separately. A tape based storage device may be used to capture the video once an effect is created. In addition, an additional video channel (and HD codec) enables the video to be stored in real-time to disk for use in a subsequent composition.

Figure 2:
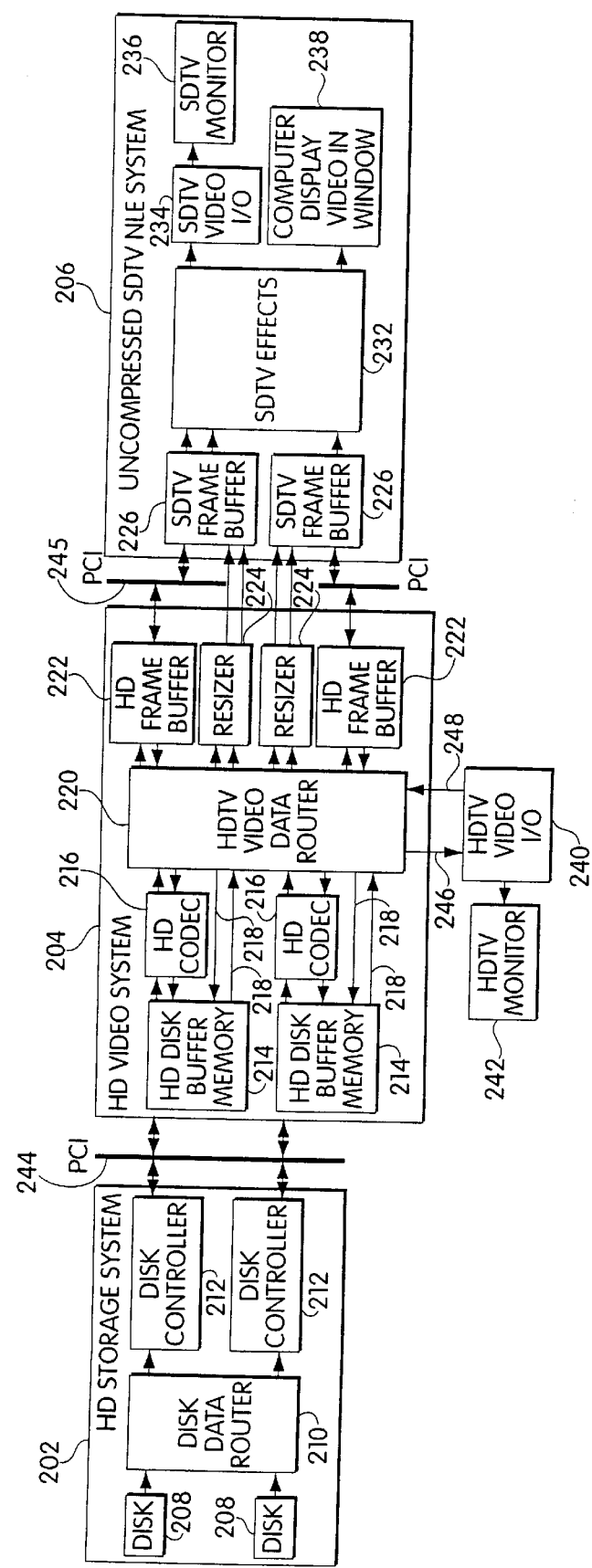
FIG. 2 is a block diagram of a standard definition television (SDTV) editing system used for HDTV editing and digital visual effects previsualization.

FIG. 2 is a block diagram of a SDTV editing system used for real-time HDTV editing and digital visual effects previsualization according to an embodiment of the present invention. This system allows lower cost editing by using available SDTV devices to previsualize HDTV video effects and allows video sequences to be edited while preserving the video that is stored in storage system 202 in its original HDTV format (e.g., uncompressed, HD-D5, HDCam, MPEG2 HL@PP, etc.). In addition, the system shown in FIG. 2 is compatible with fully featured real-time HDTV systems.

The system shown in FIG. 2 includes a video data storage system 202, HD video system 204 and standard definition television non-linear editing system (SDTV NLE) 206. Storage system 202 includes non-linear storage devices, such as disks 208 and stores HDTV video digitally using compressed and uncompressed formats. The video that is stored on disks 208 is not modified in the non-linear editing process to avoid generation losses when using compression. Therefore, when a stored video frame is manipulated, the original frame remains untouched and a new frame or sequence of frames is created for the new video. The storage system 202 is capable of playing multiple streams of full resolution and full data rate HDTV video stored in compressed or uncompressed formats for the purpose of generating real-time transition effects (e.g., wipes, dissolves, picture-in-picture, etc.). Storage system 202 also includes disk data router 210 and disk controllers 212 and is scalable depending on the number of streams in the editing system.

HD video system 204 is connected between HD storage system 202 and non-linear editing system 206. Video system 204 includes HD disk buffers 214 which synchronize the video data that is passed between the storage system 202 and the HD router 220 through HD codec 216. HD codec 216 is used to decompress HD video data that was previously compressed for storage before it is sent to non-linear editing system 206. HD codec 216 may also be used to compress or decompress HD video data for storage. HDTV video data router 220 determines whether HD video data is to be sent to the non-linear editing system 206, to HD storage system 202 or output to HDTV video I/O 240.

Resizers 224 are used to take the HD video data from HD video data router 220 and reformat it to fit into the bandwidth requirements of the non-linear editing system through video filtering and resampling to scale the spatial resolution of the HDTV video. Resizers 224 convert HD video data to SDTV resolution in real-time. This allows an SDTV representation of an HDTV image to be displayed on a standard NTSC monitor or on a RGB computer monitor. The HDTV video is able to retain its original aspect ratio (16:9 or 4:3) and the SDTV system is able to operate using progressive and interlaced formats in these aspect ratios.

FIG. 2 includes an SDTV frame buffer 226 between the HD video 204 and the SDTV video effects module. Hardware which allows system responsiveness to be high and latency through the SDTV frame buffer 226 to be low may be used to control the process of filling the SDTV frame buffer 226. Software may also be used. The HDTV video system 204 generates the SDTV data at a constant rate, while the data rate of the SDTV pipeline may be variable (in a dataflow system). However, the average data rate of the constant flow data is approximately 21 MHz. The SDTV pipeline uses a valid signal as part of the processing pipeline and interconnection to manage the reception of data from the frame buffer 222. Software such as the software used in the Media Composer editing system by Avid Technology, Inc. may manage the frame buffer 222 through the use of circular link list direct memory access (DMA) structures. Since the data rate of the video arriving at the frame buffer 222 is constant, after the video flow commences, software such as the software used in the Media Composer editing system by Avid Technology, Inc. is able to track the state of the SDTV frame buffer pointers to avoid overrunning the buffer, and to avoid reading the buffer when data is not yet valid.

Non-linear editing system 206 is used for previsualization of edited HD video data in real-time. SDTV digital video effects module 232 adds desired transition effects (e.g., wipes, dissolves, picture-in-picture, etc.) to the digital video data or manipulates the digital video data (e.g., page curls, ripples, etc.). The video data including the effects is blended by the SDTV effects module 232, which outputs the edited video data to SDTV video input/output module 234. The video data with the effects may be previsualized on SDTV monitor 236 or on a computer display 238. Previsualization includes real-time viewing, at less than full resolution, of an effect applied to video data. Previsualization saves time since effects can be viewed as they are added to the video data, without saving the edited video data to a tape or disk and retrieving the same or a new piece of video data to be edited each time a new effect is desired. Since SD equipment may be used for adding effects and HD equipment is not needed for previsualization, the cost of editing may be reduced.

Figure 3:
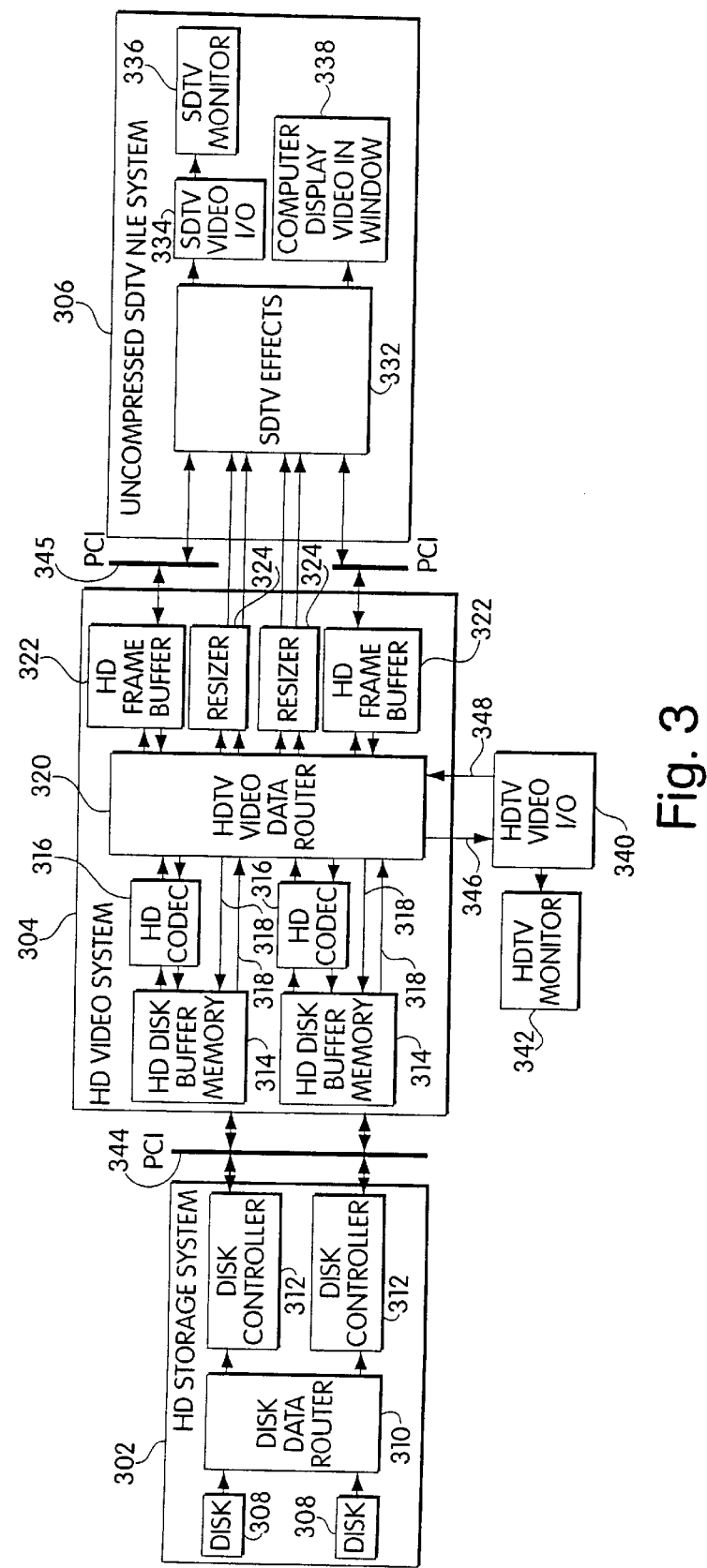
FIG. 3 is a block diagram of a SDTV editing system directly interfacing with a HDTV resizer, according to an embodiment.

FIG. 3 shows an alternative embodiment of the SDTV editing system of FIG. 2. In FIG. 3, SDTV frame buffers (e.g., 226, FIG. 2) are not used and the SDTV NLE system 306 is connected directly to the resizer 324. In this embodiment, the HDTV frame buffer 322 and the HDTV video router 320 control the flow of data. This is possible using hardware with direct memory access and flow control capability. In this system, separate interfaces to read and write to memory may be used. Three alternative methods which may-be used to render HDTV video data to full resolution using the system in FIG. 3 are described below.

In one method of rendering using the system shown in FIG. 3, the SDTV previsualization system 306 renders HDTV video data. The HD frame buffers 322 capture the HDTV video which is retrieved from storage system 302 and editing effects are processed in non real-time. The frame buffers 322 store a plurality of HDTV frames to assist in capturing and storing frames to disk.

In another method using the system shown in FIG. 3, rendering the HDTV video to full resolution may also be performed by using the frame buffers 322 and real-time HDTV video devices. Multiple uncompressed frames of HDTV video may be rendered using the frame buffers 322 as temporary storage for the uncompressed intermediate composites. This is possible by decompressing the frames, creating the effect, storing the intermediate result in the frame buffer 322 and then adding additional layers in combination with the stored uncompressed HD video. The frame buffer 322 memory size determines the limit on the number of intermediate frames in a single rendered composition.

In another method using the system shown in FIG. 3, rendering the HDTV video to full resolution may include using non real-time hardware that is able to process the full resolution video data, but not in real-time. The frame buffers decouple the real-time instantaneous HDTV data rate from the lower data rate of the digital video effect.

Figure 4:
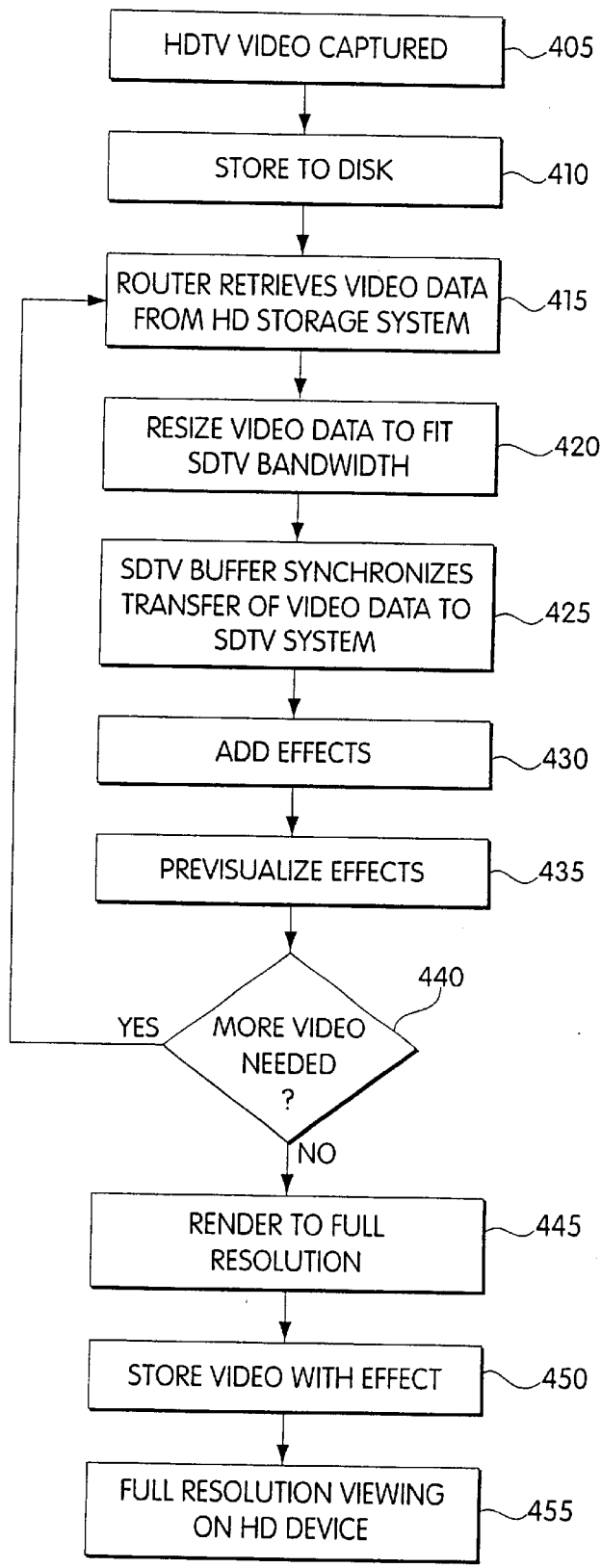
FIG. 4 is a flowchart describing how the SDTV editing system of FIG. 2 is used for HDTV editing according to an embodiment.

The operation of FIG. 2 will now be described in connection with the flowchart of FIG. 4. In step 405, HDTV video data is captured by HDTV video data router 220 which sends the HDTV video data to be stored to disk 208 in the HD storage system in step 410. The stored HD video data may be compressed or uncompressed. The HDTV video data may be captured in real-time from a video source (e.g., tape deck, camera, etc.) or through a computer-based method (e.g., a Local Area Network (LAN), Digital Linear Tape (DLT), etc.). In step 415, HDTV video data router 220 retrieves video data from the HD storage system 202. Video data router 220 may retrieve a frame of video data or a non-linear sequence of frames for editing. The HDTV video data may be compressed or decompressed by HD codec 216 before it is sent to be stored or retrieved. HD disk buffer memory 214 controls the flow of the video data by exchanging control flow information with disk controller 212. Hand shaking protocols or other interfaces, such as the hardware dataflow interface described above, may be used to control the flow of data.

Resizer 224 provides an output of SDTV resolution video data based on the HD video data by adjusting the HDTV video data to fit into the SDTV bandwidth of the SDTV NLE system 206. As discussed above, in order for the digital HDTV signal to fit in the standard transmission bandwidth there is a need for a compression ratio of approximately 5½:1.

The resized HDTV video data is sent to SDTV frame buffer 226 which is used to synchronize the transfer of video data in the SDTV editing system 206 in step 425. The SDTV editing system 206 adds effects in step 430 to the resized HDTV video data. The effects may include transition effects such as wipes, fades, etc.

In step 435, the resized HDTV video data, including the added effects, is previsualized on SDTV monitor 236, on computer display 238, or other displays. This allows the user to view the added effects from editing at a lower resolution and avoids rendering new video for each effect as well as the problems associated with incurring a generation loss from compression of the video data.

In step 440, when more video data is needed for editing, the process returns to step 415, in which the router retrieves video data from the HD storage system 202. When more video data is not needed for editing, then the previsualized video data is rendered to full resolution in step 445 by SDTV effects module 232 in non real-time, using hardware or software rendering devices as described above.

In step 450, the rendered video is typically stored in storage system 202, and can then be retrieved for full resolution viewing on an HD device such as HDTV monitor 242, in step 455. The stored video data may also be output for creating video for distribution.

The operation of FIG. 3 is similar to the operation of FIG. 2 described above in reference to FIG. 4. However, in step 425, if the SDTV NLE system (i.e., 306) does not include SDTV frame buffers (e.g., 226, FIG. 2) then the resized HDTV video data from resizer 324 is sent directly to SDTV editing system 306, and the transfer of the video data is controlled by HD-1080 frame buffers 322.

Figure 5:
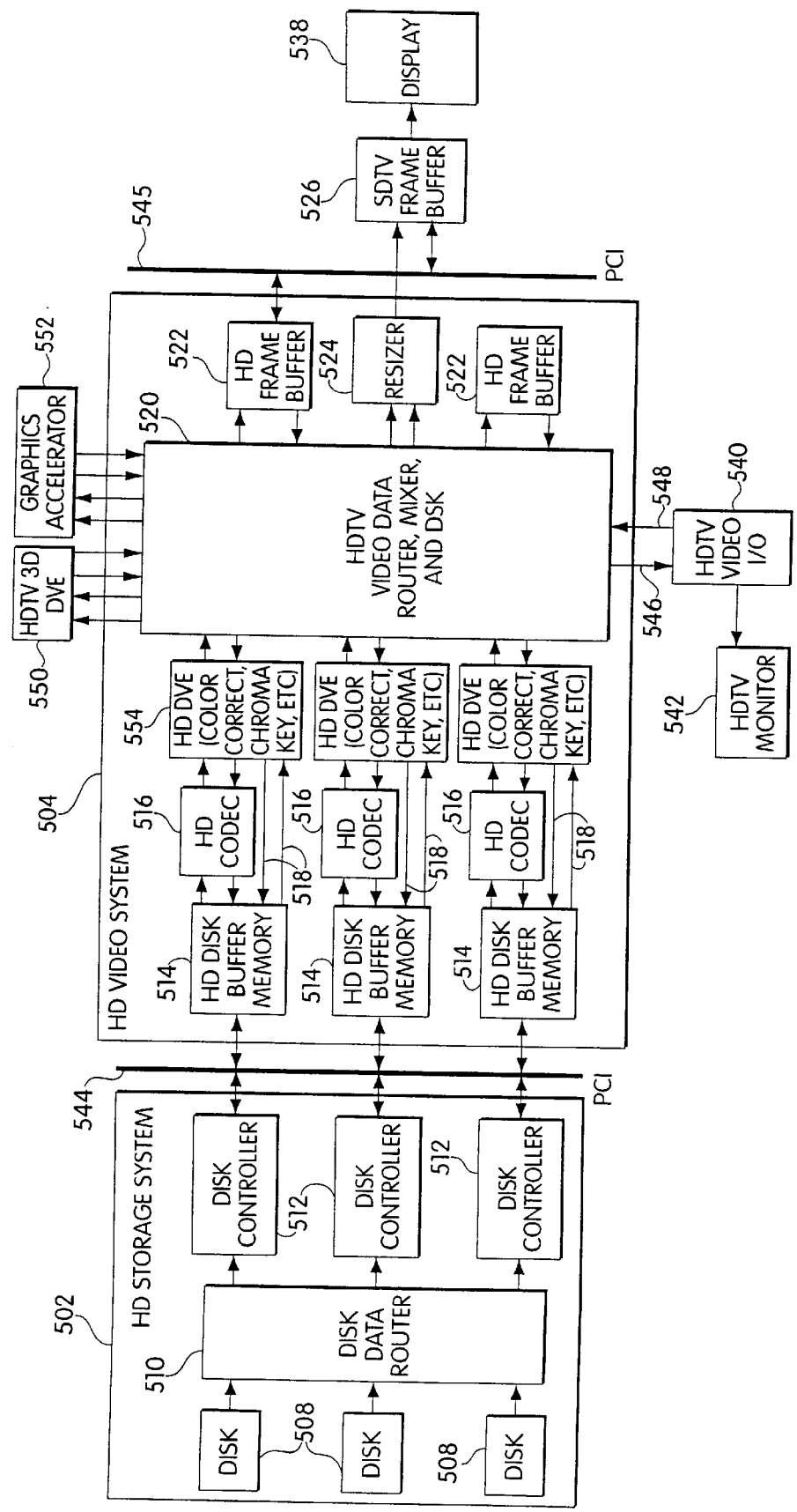
FIG. 5 is a block diagram of a fully featured real-time HDTV editing system according to an embodiment.

FIG. 5 is a block diagram of a fully featured real-time HDTV editing system. The system in FIG. 5 is comparable to an SDTV editing system, but uses HDTV video. The system includes a real-time HD DVE module 554 for each video channel (color correction, resize, flop, image crop, etc.), and more complex 3D digital video effects capability for transition effects and video manipulation (page curls, ripples, perspective warp, etc.) by using HDTV 3D DVE module 550. The system is able to composite multiple video streams using the 3D DVE module 550, and also using HDTV video router 520, which includes a mixer, and Downstream Keying (DSK) hardware. The system also includes DSK hardware to combine real-time video with a static graphic (e.g., a title), as well as an animation rendered in real-time using for example, software such as a graphics accelerator 552 which produces a video output with a key, including products such as OpenGL 3D graphics DVE accelerator by Silicon Graphics. HDTV video compression is possible using HD codecs 516, although uncompressed video playback is also possible using uncompressed video input/output paths 518. The system shown in FIG. 5 includes three video channels for real-time rendering while playing.

FIG. 5 operates in real-time using HDTV resolutions and data rates. In addition to processing HDTV video, the system in FIG. 5 is also capable of processing SDTV video in real-time, using the same components. The system is able to route SDTV video through the HDTV router 520 (single and multiple streams), and in combination with HDTV video. The DVE, mixing, and other functions scale HD video data from HDTV-resolution to the lower resolution SDTV processing and data rates.

Figure 5A:
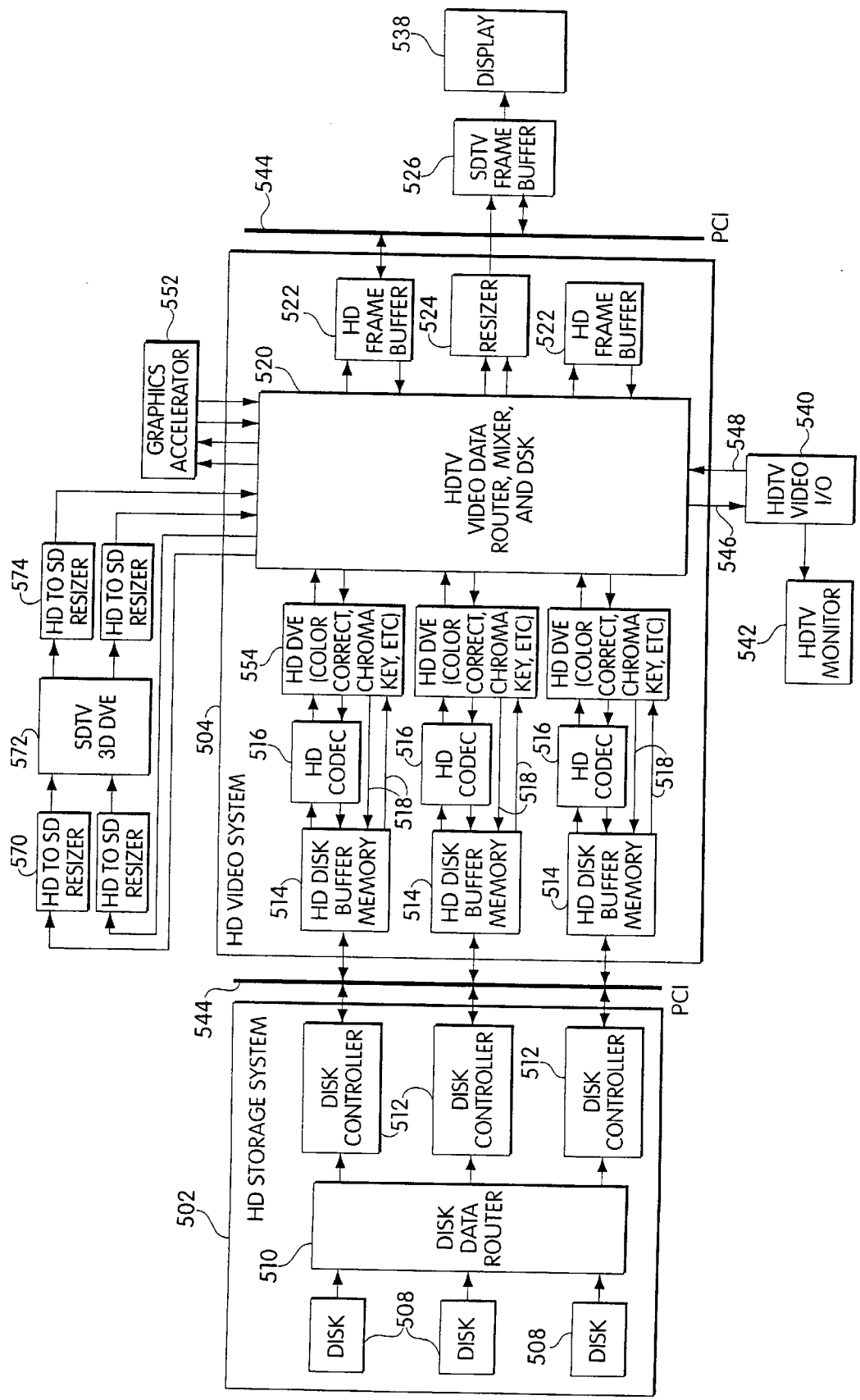
FIG. 5a is a block diagram of a modified system of FIG. 5.

A modification to FIG. 5, as shown in FIG. 5a, may be made to the HDTV 3D DVE module 550 which results in a hybrid system using an SDTV 3D DVE module 572 and HD-to-SD resizers 570 and SD-to-HD resizers 574 to replace the HDTV 3D DVE module 550. This modified system may be used to previsualize the 3D DVE module in real time, using SDTV resolutions.

Figure 6:
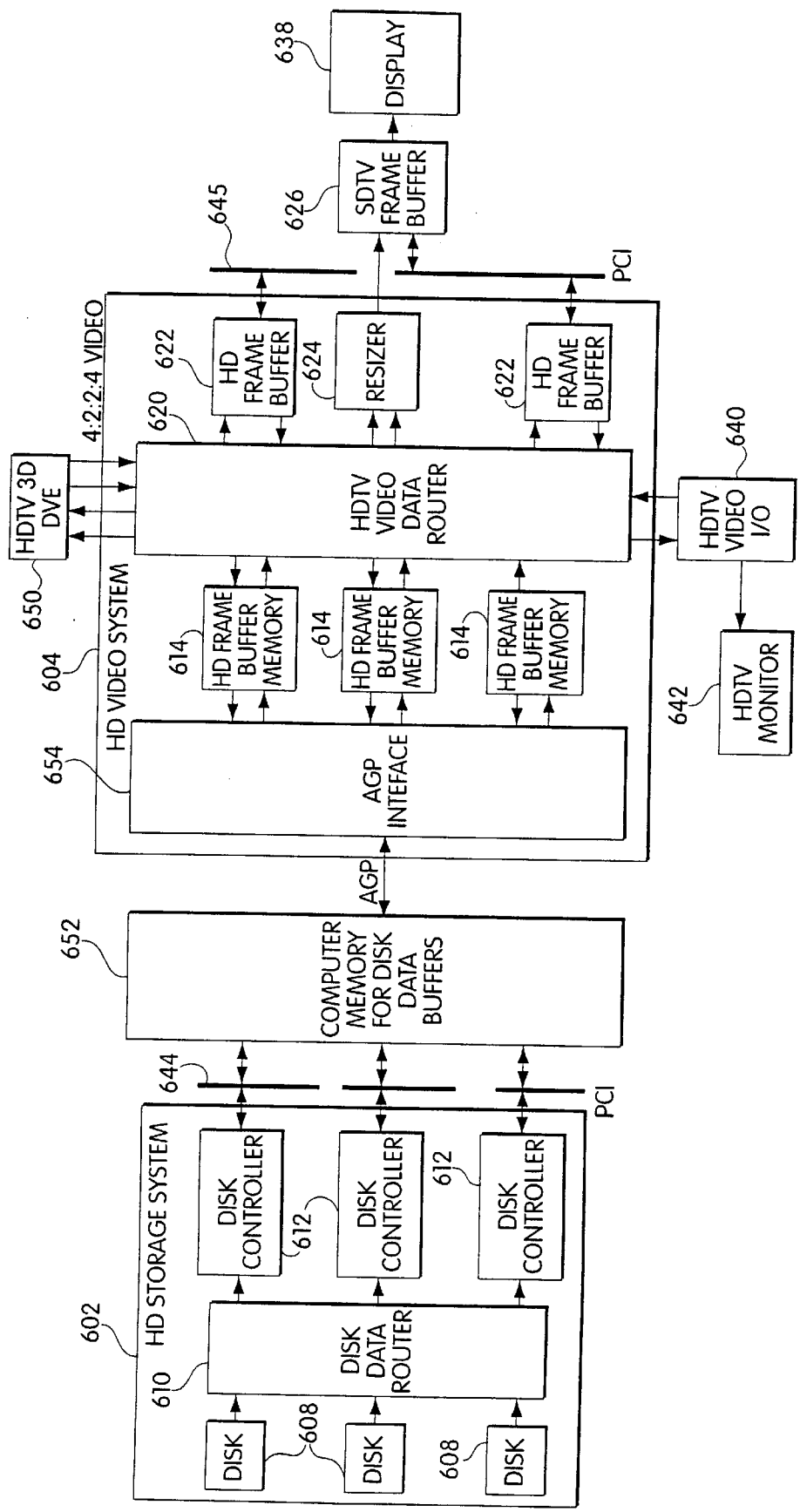
FIG. 6 is a block diagram of a real-time uncompressed three stream HDTV video system using an accelerated graphics port.

FIG. 6 is a block diagram of a real-time uncompressed three stream real-time HDTV video system using an Accelerated Graphics Port (AGP) interface for a bus protocol to a peripheral connect interface (PCI) bus, for example, between the HD video system 604 and the computer memory 652.

The system of FIG. 6 uses a plurality of PCI computer busses, for example, FibreChannel's PCI interfaces, to isolate HDTV data streams (64-bit PCI or 66 MHz PCI used for real-time HDTV uncompressed formats) for the purpose of aggregating the video streams into a common high speed host computer memory. This enables disk data to be sent across PCI busses, transferred to host memory 652, and then transferred over the high performance data interface (AGP) 654 to HD video processing system 604. The system 604 uses multiple DMA channels at the AGP interface 654 to access the host memory 652 for playing multiple streams of video, and for capturing multiple streams of video. The AGP DMA device may be implemented as separate DMA devices or as a DMA capable of multiple simultaneous contexts. The PCI bus in an embodiment may be able to sustain a component bandwidth of 1 or 2 streams of HDTV compressed video data, with approximately 30–40 Megabytes per stream. The AGP may sustain the bandwidth of uncompressed HDTV video data.

The AGP interface 654 and high speed host memory 652 may also be used to create connectivity between the storage system 602 and the HD video system 604 for rendering software DVEs. The HD video system 604 may also place video frame buffers in host CPU memory 652, such as those required for rendering, timebase correction, and DVE operations requiring input and/or output frame buffers, etc., to reduce the cost of the video system hardware.

The HDTV video system 604 includes disk data buffers 652 (to buffer data from the disk controllers 612), frame buffers 614 to buffer latencies in accessing disk data buffers 652, an interface to an HD codec (not shown) (held internally on a PCI board or externally using a digital interconnect, such as, for example, Panasonic's HD-D5 codec), and an interconnect to the HDTV video I/O 640 and monitor 642. Full resolution HDTV frame buffers 622 operate at a full data rate to capture HDTV frames when necessary for full resolution effects processing (rendering). Video data is transferred between the computing system and the HD frame buffers 622 and resizer 624 subsamples the full resolution HDTV video to SDTV data rates, in the 16:9 aspect ratio (or 4:3). The resized video is transferred to a display 638 (i.e., a monitor) and an uncompressed SDTV video editing system (not shown), as discussed above, for real-time DVE and editing previsualization.

In systems limited by PCI and storage throughput constraints and when the number of uncompressed storage elements is cost prohibitive, data compression is needed. The storage systems of an embodiment of the present invention may be independent of the system as long as a method exists to distribute the video bandwidth to the HDTV devices, while providing symmetric data access. Multiple storage controllers and segmented PCI busses may be used when compressing HDTV video or when using uncompressed HDTV video.

Figure 6A:
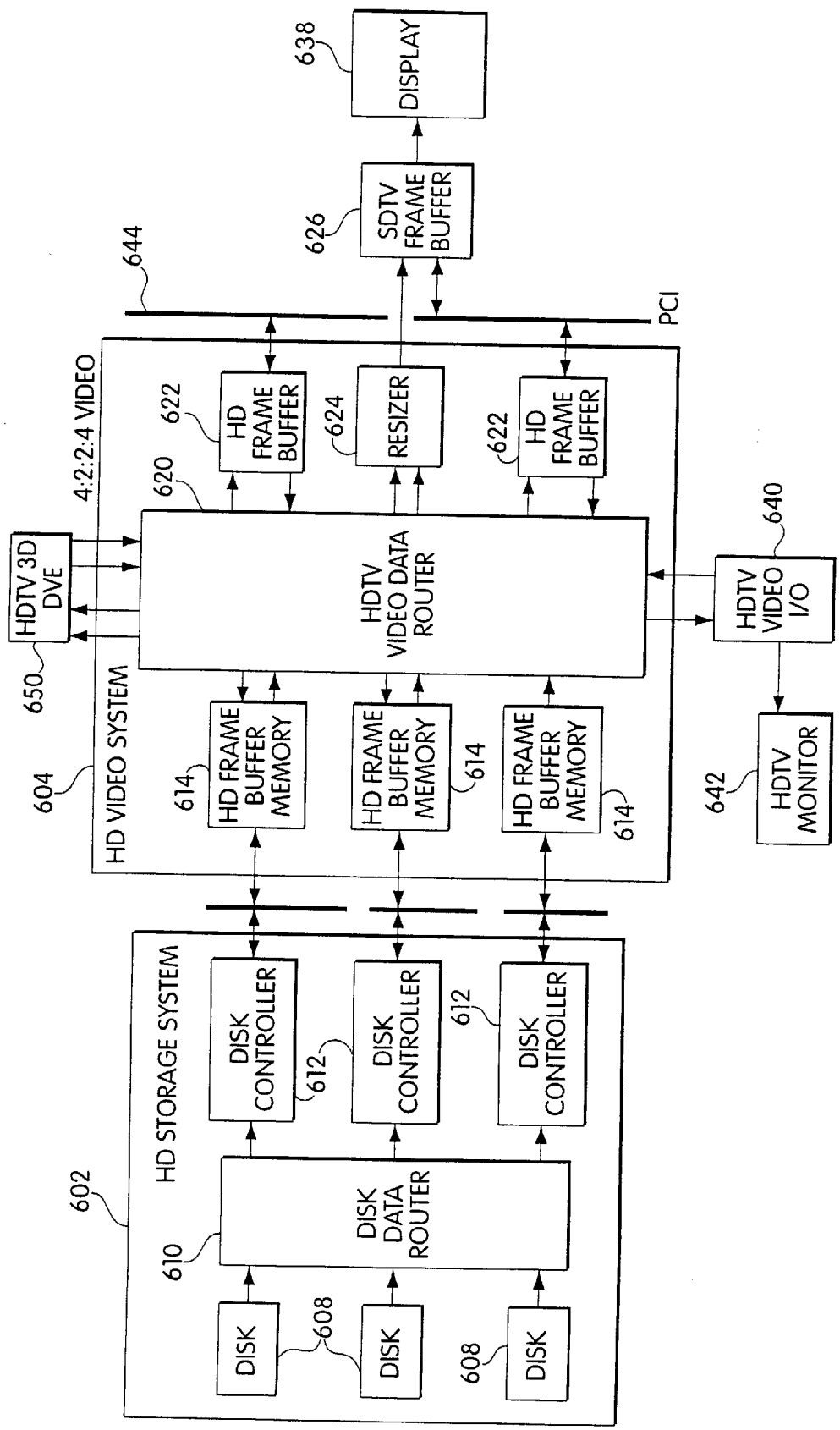
FIG. 6a is a block diagram of a modified system of FIG. 6.

The system of FIG. 6a is a block diagram of a real-time three stream uncompressed HDTV video system. The number of PCI interfaces scales with the bandwidth demand, as does the number of separate PCI bus segments to support the bandwidth of the system. The system shown in FIG. 6a uses separate PCI bus segments for each HDTV uncompressed disk data buffer 614. The storage system 602 provides a shared data access method by routing disk data packets to the appropriate disk controller for the HDTV stream that the data is directed toward. The HDTV router 620 may provide connectivity of video streams when the video manipulation occurs in a device such as DVE module 650.

Figure 7:
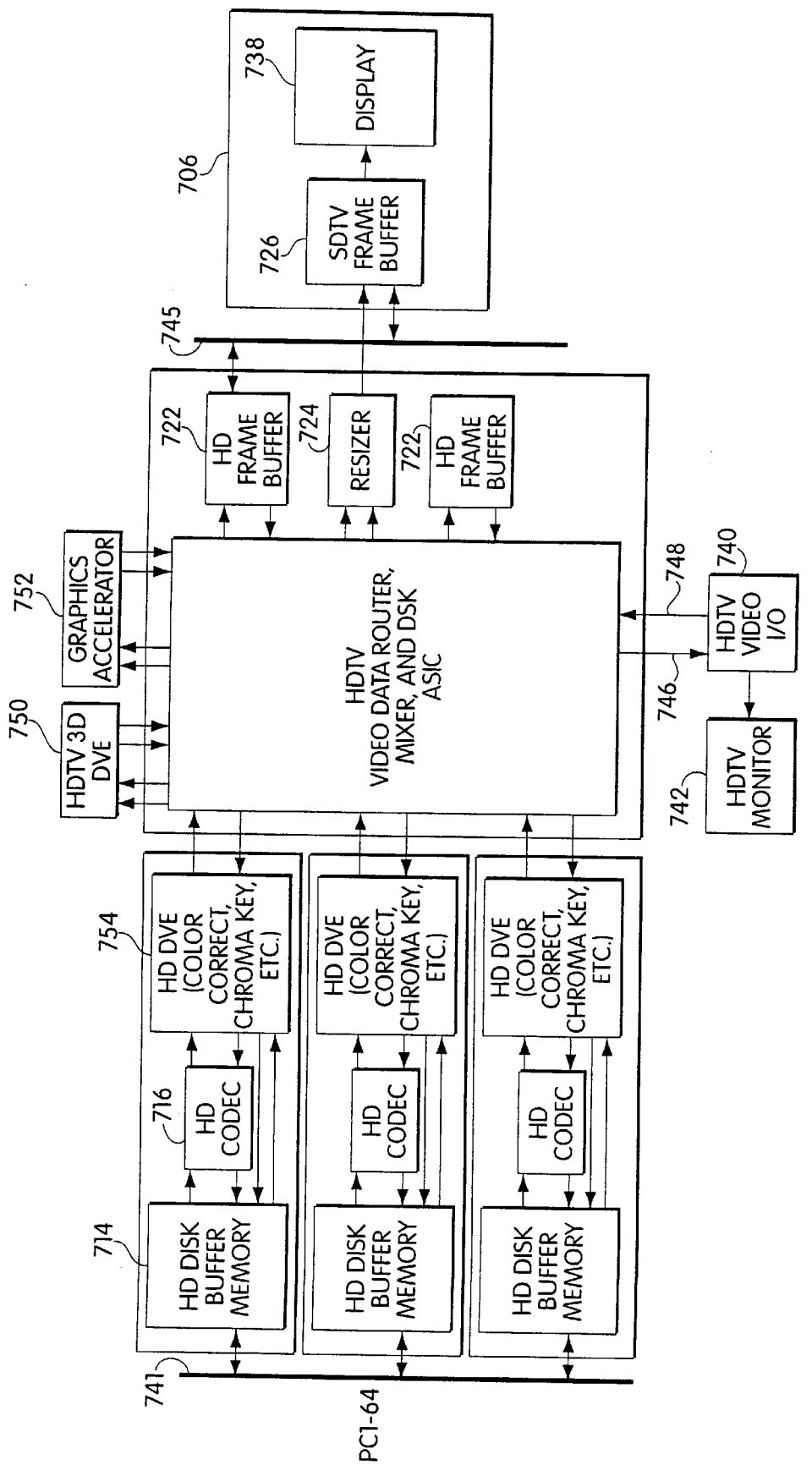
FIG. 7 is a block diagram of an HDTV video system.

FIG. 7 is a block diagram of an HDTV video system. Each video channel interface shown in FIG. 7 is implemented in a single ASIC. Each ASIC may include a 64-bit PCI interface (741), 1500 MB/s memory interface for the disk data buffer 714, and the HD DVE module 754. The 2D DVE operations may include color correction, chroma, and luma key generation, video resizing, and motion effects. Each video channel interface is able to process video in real-time and interface to the HDTV data router ASIC using a high speed, desktop video interconnect. Dual HDTV frame buffers with PCI interfaces may be controlled by a single ASIC. Module 706 may be used for viewing HDTV composites.

One advantage of the present invention includes the ability to remain "on-line" while performing edits and viewing the edited video, without going back to a disk or tape to retrieve a piece of video. Another advantage includes reducing the number of real-time HDTV components required when editing HDTV video by using standard definition equipment. The present invention allows HD and SD formatted video data to be combined and lower resolution devices can be used to effectively previsualize effects in real-time even though the pre-visualized image is not at full resolution. In addition, to prevent degradation, an original video data file is stored in a storage system and editing is performed on a copy of the video data file.

The editing system of the present invention may use dataflow video pipelines, interconnects, and DMA controllers, coupled through FIFOs, to enable the combination of HDTV and SDTV video devices and data rates in the same system. When locking to an HDTV reference clock, the SDTV system is only required to remain in synch to output frames as they become available from the HD subsystem. In the case of creating video for SDTV distribution from an HDTV source, and using external HDTV devices in conjunction with this invention, the 27 MHz clock reference from the SDTV system generates a 74.25 MHz clock for the HDTV subsystem and its external components.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A nonlinear editing system for editing a program from one or more high definition sources, comprising:

a random access computer readable medium for storing a plurality of sequences of digital images corresponding to the one or more sources, wherein each of the plurality of sequences is stored in a data file and wherein each image is a high definition image having a number of lines greater than or equal to 1080;

an editing interface that allows a user to specify a representation of the program using a sequence of segments of said plurality of sequences of digital images stored on the random access computer readable medium;

a resizer having an input connected to receive high definition images from the random access computer readable medium and having an output for providing standard definition images having less than or equal to 625 lines, obtained by resizing the high definition images;

a standard definition display connected to the output of the resizer that displays the standard definition images output by the resizer;

a high definition display having an input connected to receive high definition images from the data files stored on the random access computer readable medium that displays the high definition images; and a playback module that receives the representation of the program and causes images of the program to be displayed on the standard definition display and the high definition display at substantially the same time and in real time by directing the high definition images from the data files stored on the random access computer readable medium to the high definition display and the resizer.

2. A nonlinear editing system for editing a program from one or more high definition sources, comprising:

a random access computer readable medium for storing a plurality of sequences of digital images corresponding to the one or more sources, wherein each of the plurality of sequences is stored in a data file and wherein each image is a high definition image having greater than or equal to 1080 lines;

an editing interface that allows a user to specify a representation of the program using a sequence of segments of said plurality of sequences of digital images stored on the random access computer readable medium, wherein each segment is defined by a reference to one of the plurality of sequences of digital images and a range in the sequence of digital images;

a resizer having an input connected to receive high definition images from the random access computer readable medium and having an output for providing standard definition images having less than or equal to 625 lines, obtained by resizing the high definition images;

a standard definition display connected to the output of the resizer that displays the standard definition images output by the resizer;

a high definition display having an input connected to receive high definition images from the data files stored on the random access computer readable medium that displays the high definition images; and a playback module that receives the representation of the program and causes images of the program to be displayed in synchronization and in real time on the standard definition display and the high definition display by directing the high definition images from the data files stored on the random access computer readable medium to the high definition display and the resizer.

* * * * *